June 19, 1956 H. E. COOPER 2,751,078
WEED CLEANER ADAPTER UNIT FOR COMBINES
AND AUGER EXTENSION THEREFOR
Filed July 10, 1950 2 Sheets-Sheet 1
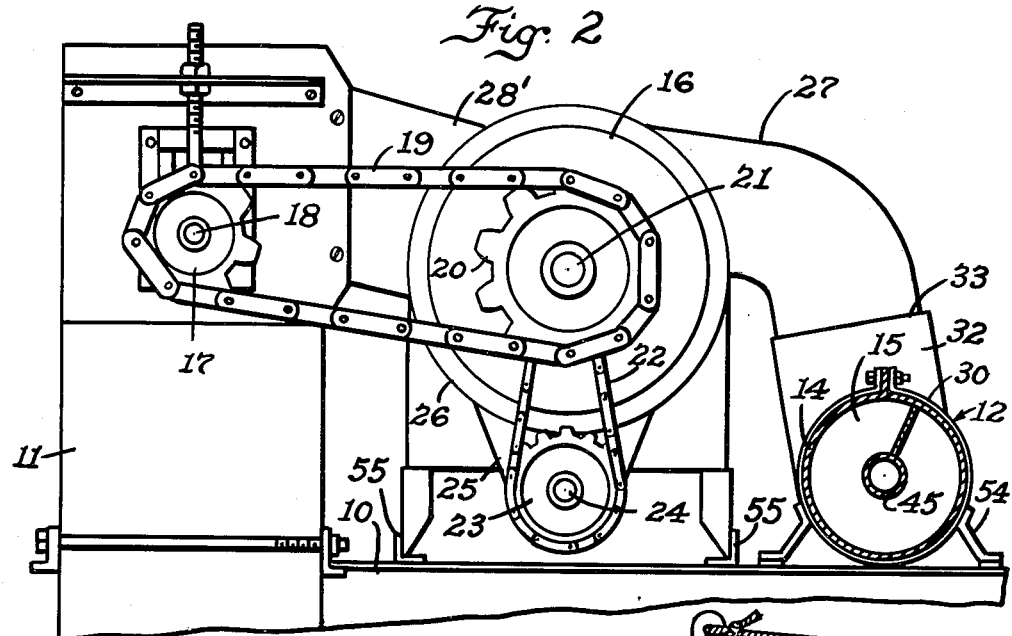
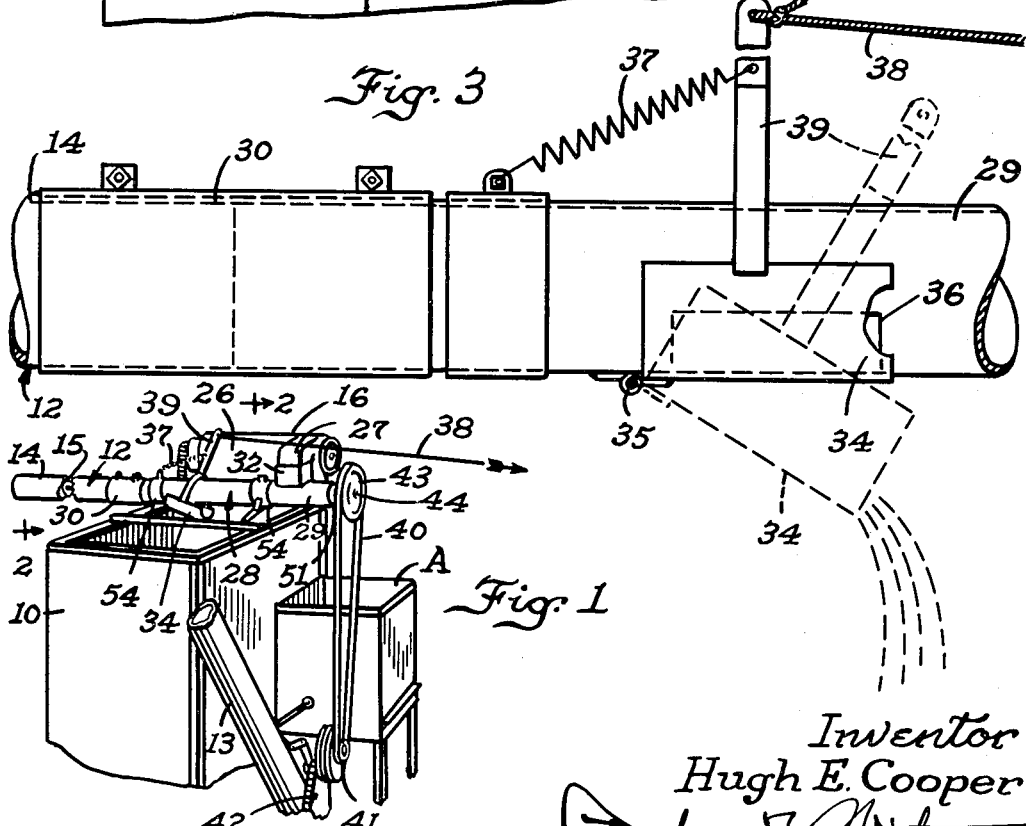
Inventor
Hugh E. Cooper

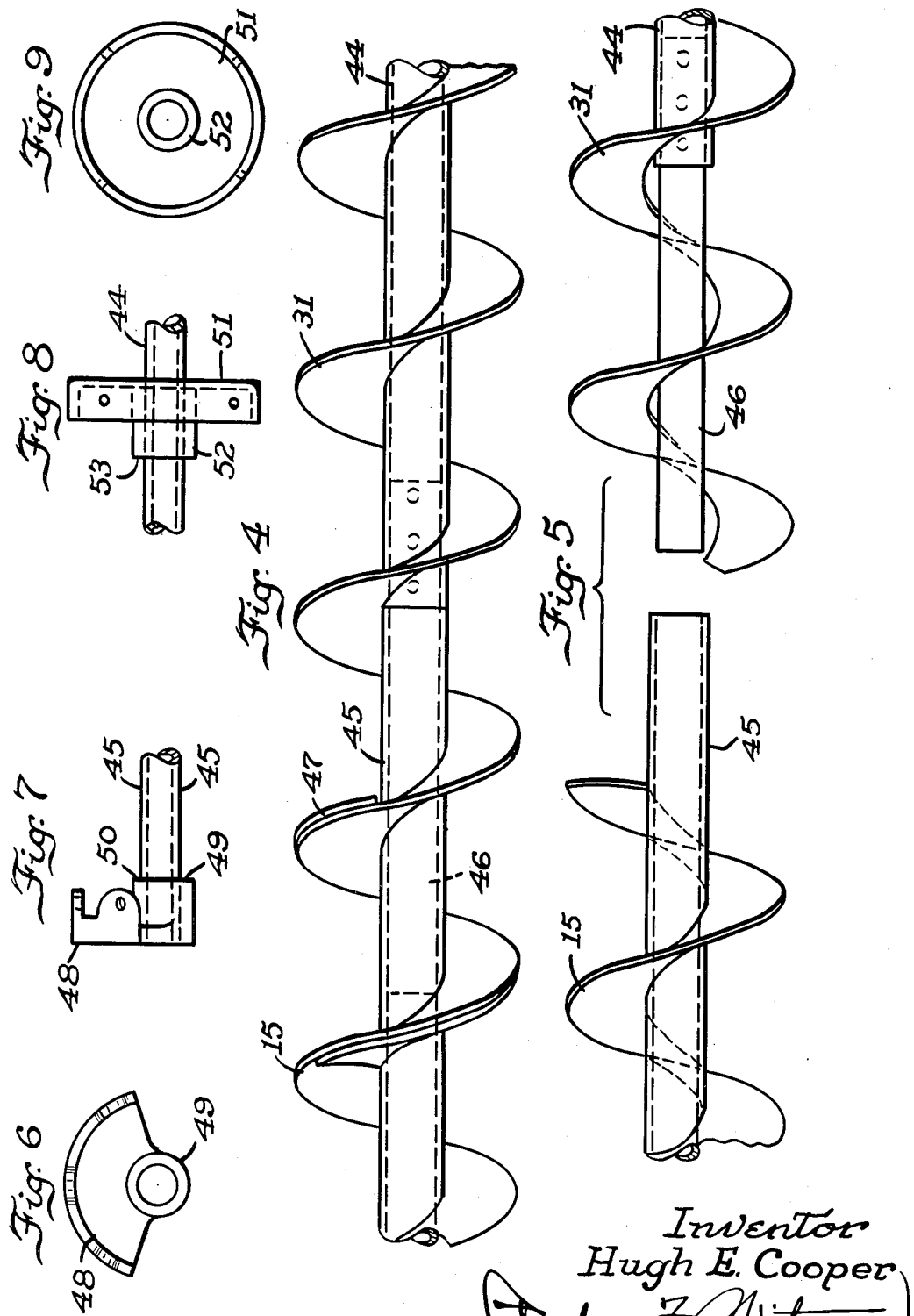

United States Patent Office 2,751,078
Patented June 19, 1956

2,751,078
WEED CLEANER ADAPTER UNIT FOR COMBINES AND AUGER EXTENSION THEREFOR

Hugh E. Cooper, Rochelle, Ill.

Application July 10, 1950, Serial No. 172,832

1 Claim. (Cl. 209—241)

This invention relates to a new and improved weed cleaner adapter unit and auger extension therefor for application to wagon loading attachments on harvester-threshers or "combines," such a wagon loading attachment being disclosed in the copending application of Emrich A. Weishaar, Serial No. 155,696, filed April 13, 1950, now Patent No. 2,667,028.

In harvesting standing grain with a combine, it was the practice prior to the Weishaar invention to catch and store the freshly cut and threshed grain in a bin and unload the grain from the bin into wagons placed at different locations around the field, the combine being stopped for each unloading operation when the bin is filled. With the Weishaar wagon loading attachment, however, the time loss involved in that old procedure is eliminated, because the grain as it is harvested can be discharged directly into a trailing wagon, the grain being diverted into the bin only occasionally by the opening up of a rope controlled bypass gate provided for that purpose and operable from the tractor seat, as, for example, when unhitching a filled wagon and hitching another wagon in place of it, and in turning corners sharply with a narrow box wagon to prevent the throwing of grain onto the ground, and when the bin is being filled as a reservoir, and also in the harvesting of small seeds or grains not bulky enough to require use of a wagon. The Weishaar attachment comprises an elongated conveyor tube or conduit extending from a point over the bin and under the grain elevator discharge rearwardly of the combine body to a point over the wagon box, and having a power operated auger working the full length thereof to convey the grain to the wagon, the attachment including an inverted V-shaped chute, one leg of which extends from the grain elevator discharge to the intake end of the grain conveyor conduit, and the other leg of which is directed downwardly into the bin, so that a gate pivoted at the apex of the V and normally spring-pressed to one extreme position closing the entrance to the last named downwardly directed leg of the V-chute will serve when operated to the other extreme position to stop the discharge of grain into the conveyor conduit immediately and divert the grain directly into the bin so long as the gate is held open.

Clean grain earns a better price on the market and makes better seed for the next year's planting. Farmers suffer considerable losses where the grain is dirty and they get lower prices because of dockage and the expense of freight charges on dockage. It has, therefore, become necessary in most cases to provide weed cleaners as an adjunct to the wagon loading attachment, so that the dockage can be separated out and collected in sacks for binning, only the clean and polished grain being delivered into the wagon or bin. The addition of the weed cleaner to existing wagon loading attachments presented a problem as to how to provide without too much trouble and expense the required extra length on the inner end of the conveyor tube or conduit and the power operated auger working therein, and also to provide facilities for bypassing the grain into the bin, similarly as in the Weishaar attachment. It is with the practical solution of that problem that the present invention deals, so that the farmer can at very little additional expense apply the needed weed cleaner and does not have to purchase an entire new wagon loader.

The invention is illustrated in the accompanying drawings, in which—

Fig. 1 is a perspective view from the side and front showing enough of the combine and the wagon loading attachment with the weed cleaner added thereto to enable a good illustration of the adapter unit and the improved auger extension therefor as provided in accordance with my invention;

Fig. 2 is a rear view of Fig. 1, on a larger scale, the same being taken substantially on the line 2—2 of Fig. 1;

Fig. 3 is a side view of the adapter on the same scale as Fig. 2, showing the swingable bypass chute, which in its raised inoperative position serves as a closure for an opening in the conduit extension;

Fig. 4 is a side view of the augers, showing the interconnection of the extension section with the main auger as provided in accordance with my invention;

Fig. 5 is a similar view showing the two auger parts in disassembled relationship, to better illustrate the mode of connection;

Figs. 6 and 7 are, respectively, an end view and side view of the rear end bearing for the auger, and Figs. 8 and 9 are, respectively, a side view and rear view of the inner end bearing for the auger assembly.

The same reference numerals are applied to corresponding parts throughout the views.

Referring to the drawings, the reference numeral 10 designates the bin that is provided on the front portion of a combine, it being understood that the combine is usually drawn by a tractor, by means of the tractor drawbar that extends from the rear thereof, the tractor furnishing the drive for the combine through its power takeoff in the usual way. The bin 10 is adapted to receive the freshly threshed grain discharged from an endless belt bucket type grain elevator 11, that is, when the grain is not being discharged through the conveyor 12 rearwardly from the combine into the box of a wagon, hitched to run in trailing relation to the combine. An unloading auger type conveyor 13 communicates with the hopper bottom of bin 10, and is adapted to be thrown into operation at will and swung sidewise to an unloading position to transfer grain from a bin to a wagon placed alongside the combine. In accordance with the Weishaar invention, the wagon loading attachment including the auger type conveyor 12 discharges the grain as it is harvested directly into the trailing wagon and only occasionally, as when a filled wagon is being unhitched and another wagon is being hitched in its place, and under other circumstances where the normal discharge should be interrupted, as previously mentioned, the grain is discharged into the bin through a bypass that is open temporarily, thereby saving usually about twenty-five per cent (25%) of harvesting time, reckoning in relation to the old procedure in accordance with which a binful was harvested at a time and the combine stopped periodically to empty the grain from the bin into a wagon, the new procedure necessitating stopping of the combine only long enough to unhitch one wagon and hitch another. The conveyor 12 consists of a conduit 14 with an auger 15 rotatable therein and extending the full length thereof to convey the grain rearwardly from the combine to a point directly over the wagon box, where a discharge spout (not shown) is swiveled to enable directing the grain properly into the wagon box regardless of the position the combine may assume in relation to the trailing wagon in making turns, the spout being connected with the combine, as disclosed in the Weishaar application, so as to be swung automatically in the right direction and to the right extent to keep the discharge always in approximately the right relationship to the wagon box. In the Weishaar wagon loading attachment the auger 15 is driven by a direct belt and pulley connection from the bucket type conveyor in the elevator 11, but when the weed cleaner, indicated at 16, is added, located between the conveyor 12 and elevator 11, a change in the drive connections becomes necessary, because, as disclosed in Fig. 2, the sprocket 17 fixed on the outer end of the idler shaft 18 at the upper end of the elevator 11 has a chain 19 connecting it with a sprocket 20 fixed on the end of the rotor shaft 21 of the weed cleaner, the shaft 21, in turn, also supplying the drive, as indicated by the chain connection 22 with sprocket 23 fixed on shaft 24 to a weed seed auger working in the trough 25 provided under the weed cleaner housing 26 and arranged to catch the weed seed as it is discharged through the screen in the housing 26 separating the grain from the weed seed, the grain being discharged by centrifugal action through the tangential discharge spout 27 provided on the far end of the housing 26 remote from the inlet spout 28' through which the grain is discharged from the elevator 11 into the weed cleaner. The trough 25 may discharge directly into the box A placed alongside the bin 10 to receive the dockage, or a bag may be suspended at that location for that purpose. The location of the discharge spout 27 so far forward from the end of the conduit 14 necessitates the provision of my improved adapter unit 28 which bridges this gap. It comprises an extension conduit 29 connected by means of a split screw clamp sleeve 30 with the front end of the conduit 14 of conveyor 12, together with an auger extension section 31 working inside the conduit extension 29 and arranged to be connected with the front end of the auger 15 working in conduit 14. The extension conduit 29 includes thereon an upwardly extending intake neck 32 opening into the top of the front end portion thereof and arranged for connection with the discharge spout 27, as indicated at 33 in Fig. 2. The conduit extension 29 further includes a bypass chute or closure gate 34 of elongated semi-circular or trough form hinged at one end, as indicated at 35, to the bottom of the conduit extension 29 for oscillation to and from a position closing a bypass opening 36 provided in the bottom of the conduit extension 29 intermediate the ends thereof. A tension spring 37 is provided to hold the chute 34 normally in a closed position, but the same is arranged to be moved against the action of the spring 37 to an open position by means of a rope 38 that extends from the yoke 39 forwardly to the tractor for operation by the driver by a pull on the rope. In that way grain is diverted directly into the bin 10 through the bypass opening 36 so long as the chute or closure gate 34 is held open against the action of the return spring 37.

When the adapter unit 28 is connected with the conveyor 12, a belt drive is provided, as indicated at 40, for the auger assembly 15—31, the belt 40 being driven by a pulley 41 that is driven by a power take-off from the auger drive for the unloader 13, as indicated at 42. A pulley 43 driven by the belt 40 is fixed to the outer end of the tubular shaft 44 on which the extension auger is welded, and in that way the drive is transmitted to the main shaft 45 on which the main auger 15 is welded, the shaft 44 having a pilot stub-shaft 46 welded or otherwise suitably secured in the inner end thereof and arranged to have a telescoping fit in the adjacent end of the tubular main shaft 45, the torque being transmitted from shaft 44 to shaft 45 through the interthreaded end portions 47 of the threads of the two augers 15 and 31, as indicated in Fig. 4. A segmental-shaped bearing block 48 is provided and suitably fixed in the rear end of the conduit 14 provided a bearing 49 in which the rear end of the main tubular shaft 45 is supported for rotation, the adjacent rear end of the auger 15 finding abutment against the inner side 50 of the bearing 49 to limit rearward displacement of the auger 15 and its shaft 45. The grain conveyed by the auger 15 through conduit 14 is, of course, discharged from the rear end of the conduit 14 under the bearing 49. A cylindrical bearing block 51 is provided and suitably fixed in the front end of the extension conduit 29 and has a central bearing 52 in which the shaft 44 is mounted for rotation, the front end of the auger 31 having abutment against the inner face 53 of the bearing 52 to limit forward displacement of the auger 31 and shaft 44. The augers 15 and 31 both have right hand threads so as to permit interconnection in the manner described, and, whereas they are interthreaded by clockwise rotation of extension auger 31 relative to the main auger 15, the two augers must be turned in a counter-clockwise direction to convey the grain through the interconnected conduits 14 and 29, and, as a result, there is a tendency toward unthreading the extension auger 31 from the main auger 15, and this accounts for the augers having their interthreaded end portions in snug engagement throughout the operation of the unloader, and it also accounts for the auger 15 having end thrust against the annular shoulder 50 at its rear end while the auger 31 has end thrust engagement with annular shoulder 53 at its front end.

The adapter unit 28 is suitably supported on top of the bin 10 by brackets 54, and the adapter serves to support the adjacent front end of the conduit 14 through its sleeve connection 30 with the adapter. The weed cleaner 16 is supported independently of the adapter on top of the bin 10 by means of crossbars 55, as indicated in Fig. 2.

It is believed the foregoing description conveys a good understanding of the objects and advantages of my invention. The appended claim has been drawn to cover all legitimate modifications and adaptations.

I claim:

In a combine, having an elevator for carrying threshed grain from said combine and including a driven shaft, a bin adjacent said elevator supported by said combine, a conveyor conduit disposed horizontally over said bin in spaced relation to the upper end of said elevator and driven shaft for conducting grain from said elevator, and a power-operated auger in said conduit, the improvement which consists in the provision of a power operated weed-cleaner of elongated form interposed between the elevator and the grain conveyor conduit parallel to the latter and to the aforesaid driven shaft, said cleaner including a driven shaft driven by connection with the aforesaid driven shaft, said cleaner having an inlet receiving dirt and weed laden grain from the elevator and having two outlets, namely, a clean grain outlet, and a dirt and weed outlet arranged to discharge outside said bin, and another shaft for driving a dirt and weed discharge auger in said cleaner driven by connection with the driven shaft of the cleaner, the improvement which further consists in the provision of a conduit extension establishing communication between said clean grain outlet and said conveyor conduit and provided with a manually controllable two-position bypass whereby the clean grain may be discharged directly from the weed cleaner into the bin with the bypass in one position or into the conveyor conduit with the bypass in the other position.

References Cited in the file of this patent

UNITED STATES PATENTS

| | | |
|---|---|---|
| 164,715 | Caldwell | June 22, 1875 |
| 234,971 | Elward | Nov. 30, 1880 |
| 311,052 | Anderson | Jan. 20, 1885 |
| 1,133,421 | Aspinwall et al. | Mar. 30, 1915 |
| 1,615,334 | MacGregor | Jan. 25, 1927 |
| 2,118,289 | Birkenbeuel | May 24, 1938 |
| 2,292,934 | Fitch | Aug. 11, 1942 |
| 2,306,753 | Ronning | Dec. 29, 1942 |
| 2,308,075 | Hahn | Jan. 12, 1943 |
| 2,409,292 | MacGregor | Oct. 15, 1946 |
| 2,492,915 | Carlson | Dec. 27, 1949 |
| 2,507,873 | Ward | May 16, 1950 |
| 2,625,001 | Heun | Jan. 13, 1953 |